United States Patent
Ebsen et al.

(10) Patent No.: US 10,423,335 B2
(45) Date of Patent: Sep. 24, 2019

(54) ENHANCING QUALITY OF SERVICE OF A STORAGE DEVICE

(71) Applicant: Seagate Technology LLC, Longmont, CO (US)

(72) Inventors: David Scott Ebsen, Shakopee, MN (US); Dana Simonson, Owatonna, MN (US); Ryan James Goss, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 84 days.

(21) Appl. No.: 15/639,934

(22) Filed: Jun. 30, 2017

(65) Prior Publication Data

US 2019/0004710 A1    Jan. 3, 2019

(51) Int. Cl.
*G06F 3/06*    (2006.01)

(52) U.S. Cl.
CPC .......... *G06F 3/0611* (2013.01); *G06F 3/0659* (2013.01); *G06F 3/0674* (2013.01); *G06F 3/0676* (2013.01); *G06F 3/0679* (2013.01); *G06F 3/0688* (2013.01)

(58) Field of Classification Search
CPC .... G06F 3/0659; G06F 3/0679; G06F 3/0611; G06F 3/0616; G06F 3/061; G06F 3/674; G06F 2201/805; G11C 16/10; G11C 16/225
See application file for complete search history.

(56) References Cited

U.S. PATENT DOCUMENTS

| | | | |
|---|---|---|---|
| 10,055,137 B2 * | 8/2018 | Madraswala | G06F 3/061 |
| 2009/0310408 A1 | 12/2009 | Lee et al. | |
| 2012/0173793 A1 | 7/2012 | Bueb et al. | |
| 2013/0124792 A1 | 5/2013 | Melik-Martirosian et al. | |
| 2013/0205085 A1 * | 8/2013 | Hyun | G11C 16/10 711/114 |
| 2014/0047167 A1 | 2/2014 | Kwak | |
| 2014/0215175 A1 | 7/2014 | Kasorla et al. | |
| 2015/0287468 A1 | 10/2015 | Yi et al. | |
| 2016/0035428 A1 | 2/2016 | Jung | |
| 2016/0188233 A1 | 6/2016 | Chiao | |
| 2016/0379715 A1 | 12/2016 | Pelster et al. | |
| 2017/0032829 A1 | 2/2017 | Hong et al. | |
| 2017/0069372 A1 | 3/2017 | Kodama et al. | |

* cited by examiner

*Primary Examiner* — Zhou H Li
(74) *Attorney, Agent, or Firm* — FisherBroyles LLP; Gregory T. Fettig

(57) ABSTRACT

Systems and methods presented herein provide a controller is operable to increase a number of suspend operations during read Input/Output (I/O) operations of a storage device, and to detect an increase in response times for write commands due to the increased number of suspend operations. The controller is also operable to decrease the number of the suspend operations during the reads of the storage device to decrease the response times of the write commands.

18 Claims, 8 Drawing Sheets

| Command Queue 30 | |
|---|---|
| Write | Queue Position 1 |
| Read | Queue Position 2 |
| Read | Queue Position 3 |
| Write | Queue Position 4 |
| Read | Queue Position 5 |
| Read | Queue Position 6 |
| Read | Queue Position 7 |
| Read | Queue Position 8 |
| Read | Queue Position 9 |
| Write | Queue Position 10 |
| Read | Queue Position 11 |
| Read | Queue Position 12 |
| Write | Queue Position 13 |
| Write | Queue Position 14 |
| Read | Queue Position 15 |
| Read | Queue Position 16 |
| Read | Queue Position 17 |
| Read | Queue Position 18 |
| Read | Queue Position 19 |
| Write | Queue Position 20 |
| . . . | |
| Read | Queue Position N |

*FIG. 3A*

| Command Queue 30 | |
|---|---|
| ~~Write~~ | Queue Position 1 |
| Read | Queue Position 2 |
| Read | Queue Position 3 |
| ~~Write~~ | Queue Position 4 |
| Read | Queue Position 5 |
| Read | Queue Position 6 |
| Read | Queue Position 7 |
| Read | Queue Position 8 |
| Read | Queue Position 9 |
| ~~Write~~ | Queue Position 10 |
| Read | Queue Position 11 |
| Read | Queue Position 12 |
| ~~Write~~ | Queue Position 13 |
| ~~Write~~ | Queue Position 14 |
| Read | Queue Position 15 |
| Read | Queue Position 16 |
| Read | Queue Position 17 |
| Read | Queue Position 18 |
| Read | Queue Position 19 |
| ~~Write~~ | Queue Position 20 |
| . . . | |
| Read | Queue Position N |

*FIG. 3B*

|  | Command Queue 30 |  |
|---|---|---|
| 1ms Remaining | Write | Queue Position 1 |
|  |  | Queue Position 2 |
|  |  | Queue Position 3 |
| 1.5ms Remaining | Write | Queue Position 4 |
|  |  | Queue Position 5 |
|  |  | Queue Position 6 |
|  |  | Queue Position 7 |
|  |  | Queue Position 8 |
|  |  | Queue Position 9 |
| 1.2ms Remaining | Write | Queue Position 10 |
|  |  | Queue Position 11 |
|  |  | Queue Position 12 |
| 1.5ms Remaining | Write | Queue Position 13 |
| 1.8ms Remaining | Write | Queue Position 14 |
|  |  | Queue Position 15 |
|  |  | Queue Position 16 |
|  |  | Queue Position 17 |
|  |  | Queue Position 18 |
|  |  | Queue Position 19 |
| 1.9ms Remaining | Write | Queue Position 20 |
|  | ⋮ |  |
| 8.9ms Total Write Time Remaining | Read | Queue Position N |

*FIG. 3C*

ENHANCING QUALITY OF SERVICE OF A STORAGE DEVICE

SUMMARY

Systems and methods presented herein provide for enhancing quality of service (QoS) of a storage device. In one embodiment, a controller is operable to increase a number of suspend operations during Input/Output (I/O) operations, and to detect an increase in response times for write commands due to the increased number of suspend operations. The controller is also operable to decrease the number of the suspend operations during reads of the storage device to decrease the response times of the write commands.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments are now described, by way of example only, and with reference to the accompanying drawings. The same reference number represents the same element or the same type of element on all drawings.

FIGS. 3A-3C illustrate an exemplary command queue of the storage system of FIG. 1.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments and are to be construed as being without limitation to such specifically recited examples and conditions. As a result, the embodiments are not limited to any specific examples described below.

Figure 1:
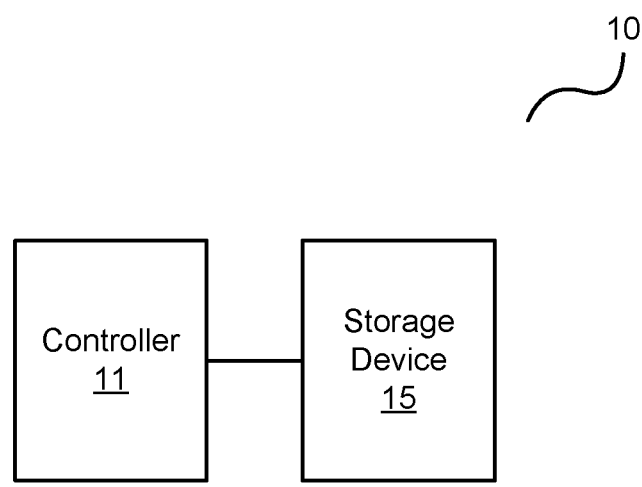
FIG. 1 is a block diagram of an exemplary storage system for enhancing QoS for a storage device.

FIG. 1 is a block diagram of an exemplary storage system 10 for enhancing QoS of a storage device 15. The system 10 comprises a controller 11 operable to read data from and write data to a storage device 15 communicatively coupled thereto. For example, the controller 11 may process read and write I/O commands to perform corresponding read and write operations on the storage device. In this regard, the controller may issue read and write commands to the storage device 15 depending on the operation to be performed.

QoS is typically a measure of a "tightness" of distribution in read and write response times. For example, in mixed read and write workloads in NAND based Solid State Drives (SSDs), a NAND die will perform reads, programs (e.g., writes), and block erases. During each of these operations, the die is generally busy for a period of time to perform each operation (e.g., approximately 50-100 µs for reads, approximately 1-2 ms for programs, and approximately 5-50 ms for erase operations). User data, however, has already been mapped to a specific die. And, if the die is busy, a read request to that die waits until the current operation finishes.

A busy die can impair read response times, resulting in an undesirable QoS of the storage device. Some commands exist to suspend current operations on a die. For example, one command can suspend a somewhat lengthy erase operation of a die such that other operations can be performed. Suspend commands can improve read response times, and thus the QoS of the storage device. But, there are generally restrictions on a number of times a command can be suspended, which also vary with the type of command being suspended. And, there are restrictions on time intervals between subsequent suspends of the same command.

Further complicating matters, erase times can vary based on temperature and age of the storage device. For example, the temperature and age of NAND cells in a flash storage device can lengthen erase command cycles. Once an erase command has been suspended for the maximum allowed number of times (e.g., to allow arriving read commands to bypass it), the remaining portion of the erase operation is inevitable and a potentially lengthy erase operation would have to be allowed to complete blocking any reads.

And, when a program operation is suspended to allow a read operation to begin, the overall program time of a write operation is elongated because a read and transfer of the read data is now inserted in the middle of the program operation. Consequently, data being written (programmed) is delayed. Depending on the workload and number of die in a configuration, excessive suspend operations impair the overall performance of the storage device.

The embodiments herein overcome these issues by determining a number of suspend operations that should be allowed based on performance (e.g., IOPS) of the storage device 15. Generally, the embodiments consider a percentage of read operations versus a percentage of write operations. In an NAND flash storage device embodiment, a controller may also take into consideration the number of die in a configuration and the characteristic times of the NAND operations.

Based on the foregoing, the controller 11 is any device, system, software, firmware, or combination thereof operable to read data from the storage device 15, to write data to the storage device 15, and to perform various other operations on the storage device 15 (e.g., command suspensions, background scans, garbage collection, error correction encoding/decoding of data on the storage device 15, etc.). The storage device 15 is any device capable of storing data, persistent or otherwise. Examples of the storage device 15 include, magnetoresistive random-access memory devices, magnetic disks, Random Access Memories (RAMs, such as DRAMs), or various combinations thereof. Accordingly, the controller 11 is operable to perform the processes disclosed herein on any variety of storage devices.

In one embodiment, the storage device 15 is a non-volatile NAND flash device configured using one or more SSD architectures, such as Single Level Cell (SLC) architectures and Multi-Level Cell (MLC) architectures. An SLC architecture allows a memory cell to store one bit of data. Traditionally, an MLC architecture meant that a memory cell could store two bits of data. But, architectures have evolved and now provide even higher levels of density, such as Triple Level Cell (TLC) architectures that store three bits per memory cell, and Quad Level Cell (QLC) architectures that store four bits per memory cell. Generally, though, any architecture storing more than one bit of data per cell may also be referred to as an MLC architecture.

Typically, each memory cell of a flash device is configured like a Metal Oxide Semiconductor Field Effect Transistor (MOSFET) with a control gate. But, each memory cell also has a floating gate surrounded by an insulating oxide layer configured between the control gate and the channel of the MOSFET. Because the floating gate is electrically isolated by its insulating layer, electrons placed on it are trapped until they are removed by an application of an electric field (e.g., an applied voltage). Placing electrons on the floating gate sets the transistor to the logical "0" state. Once the floating gate is charged, the electrons in it screen the electric field from the control gate, thereby increasing the threshold voltage of the memory cell. This means that a higher voltage is applied to the control gate to make the channel of the transistor conductive.

In order to write a value from the transistor, an intermediate voltage between the threshold voltages is applied to the control gate. If the channel conducts at this intermediate voltage, the floating gate is uncharged and causes a logical "1" to be stored in the memory cell. If the channel does not conduct at the intermediate voltage, it indicates that the floating gate is charged causing a logical "0" to be stored in the memory cell. The presence of a logical "0" or a logical "1" is sensed by determining whether there is current flowing through the transistor when the intermediate voltage is asserted on the control gate.

However, the embodiments disclosed herein are not intended to be limited to any type of storage device. For example, various types of storage devices may employ operations that suspend other in-progress operations for any of a variety of reasons. The controller 11 may balance the suspend operations in favor of I/O performance of the storage device 15 as shown and described below.

Figure 2:
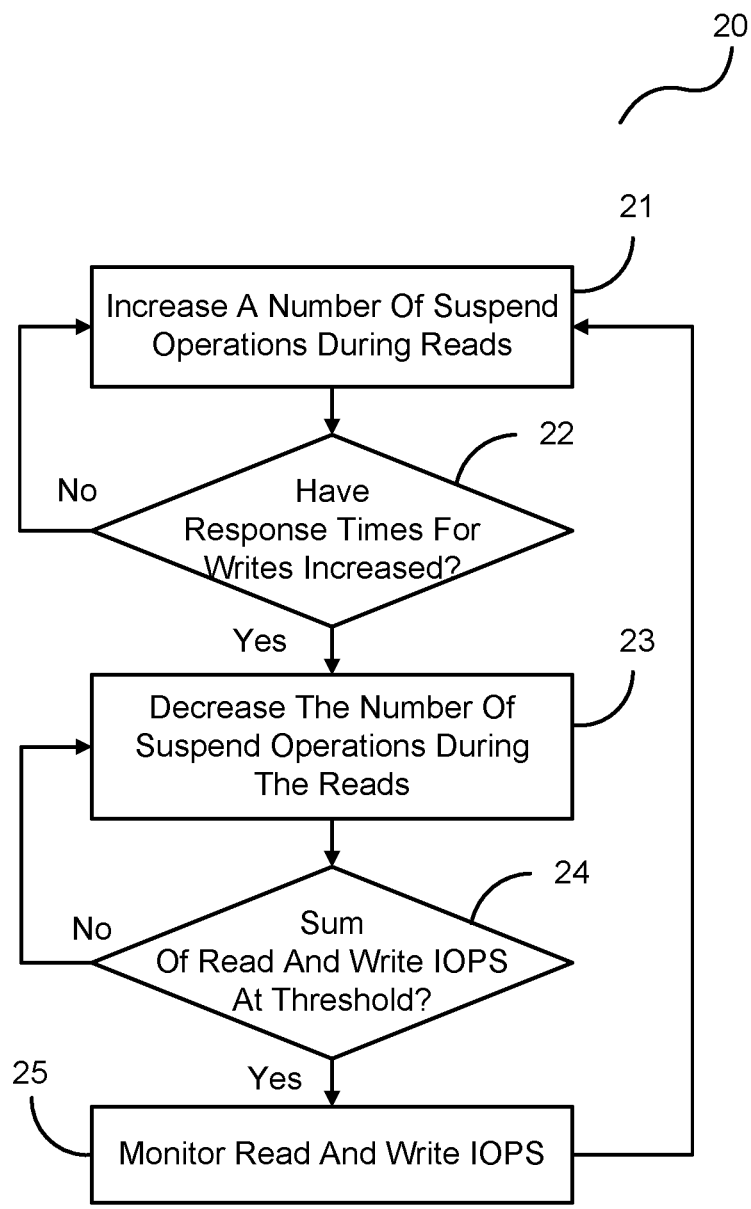
FIG. 2 is a flowchart of an exemplary process of the storage system of FIG. 1.

FIG. 2 is a flowchart of an exemplary process 20 of the system 10 of FIG. 1. In this embodiment, the controller 11 is operable to increase the number of suspend operations during I/O operations to the storage device 15, in the process element 21, to improve read response times. For example, when other operations are suspended, the IOPS of reads increase. The controller 11 may therefore monitor write response times to determine if there is an increase (e.g., a significant increase) in the write response times, in the process element 22. If there is no increase in the write response times, then the controller 11 may continue using the suspend operations during read operations, in the process element 21. Otherwise, the controller 11 decreases the number of suspend operations during the read operations, in the process element 23.

Generally, the controller 11 seeks to balance overall I/O performance (e.g., read and writes of the storage device 15) with respect to the number of suspend operations being used. For example, assume that the read IOPS are represented by:
 Read IOPs=(1/ARRT)*QD, where ARRT is the Average Read Response Time and QD is the queue depth of the read and write commands being queued.
If QD is "1" and the controller 11 employs a non-volatile cache for a command queue, the write response time is generally fixed at a constant value, roughly 10 μs. The ARRT value is usually about 120 us, but decreases when program suspend operations are allowed. In other words, when program suspend operations are used, ARRT decreases because the read commands can be serviced/executed more quickly. Thus, the read IOPS of the storage device 15 increase.

Now assume that the write IOPS are represented by:
 Write IOPS=((% Reads*(1/ARRT)+(% Writes*1/AWRT))*QD, where AWRT is the Average Write Response Time.

When the command queue is not completely filled with write commands, AWRT is relatively low and almost constant. But, when program suspends are used too often, die programming is prolonged and the command queue begins to backlog with unfinished write commands, causing an increase in write response times and thus a decrease in the write IOPS.

To illustrate, FIGS. 3A-3C show a command queue 30 with several read and write commands queued for execution. FIG. 3A shows the read and write commands as they exist in the command queue 30 before suspension operations are implemented. FIG. 3B shows the write commands being suspended (e.g., via the strike through). And, FIG. 3C shows the suspended write commands backlogging the command queue 30. Thus, the read commands can be promptly executed and increase the read IOPS, but the write commands and their lengthier program times substantially decrease the write IOPS. And, as the number and interval of suspend operations may be limited, the write commands are inevitably serviced at the expense of read IOPS. For example, FIG. 3C shows the times remaining for the write commands that have been suspended. The total write response time now extends to 8.9 ms before a read command can be executed, in this exemplary embodiment.

The controller 11 balances the read and write IOPS in such a way that the overall IOPS increases (e.g., to its largest possible value). For example, the controller 11 may employ a transformative function of the combination of read and write operations to adaptively adjust the suspend rate and/or the suspend interval to achieve a desired performance level. In one embodiment, the controller 11 may sum the read and write IOPS and determine whether that summation has reached a threshold value, in the process element 24. If the summation does not meet the threshold level, the controller 11 continues decreasing the number of suspend operations. Otherwise, the controller 11 stops decreasing the number of suspend operations and begins monitoring the read and write IOPS, in the process element 25, and increasing the number of suspend operations during reads when needed.

In this regard, the controller 11 may monitor the overall IOPS of the storage device 15 and adaptively apply suspension operations to optimize performance. For example, the controller 11 may employ an interference cancelling adaptive filter to control the number of suspension operations that are executed. In this regard, the controller 11 may input a desired IOPS for the storage device 15 based on an expected performance of the storage device 15 (e.g., expected performance being based on a priori factors such as age, wear, temperature, etc. of the storage device 15). Then, the controller 11 may begin issuing suspension commands that suspend certain write and/or erase operations on the storage device 15. By sensing the total IOPS of the storage device 15, the adaptive filter may direct the controller 11 to tailor the number of suspension commands issued to more closely align with the desired IOPS of the storage device. In this regard, the controller 11 may also adaptively adjust the intervals at which the suspension commands are issued. An example of such is illustrated in FIG. 4.

Figure 4:
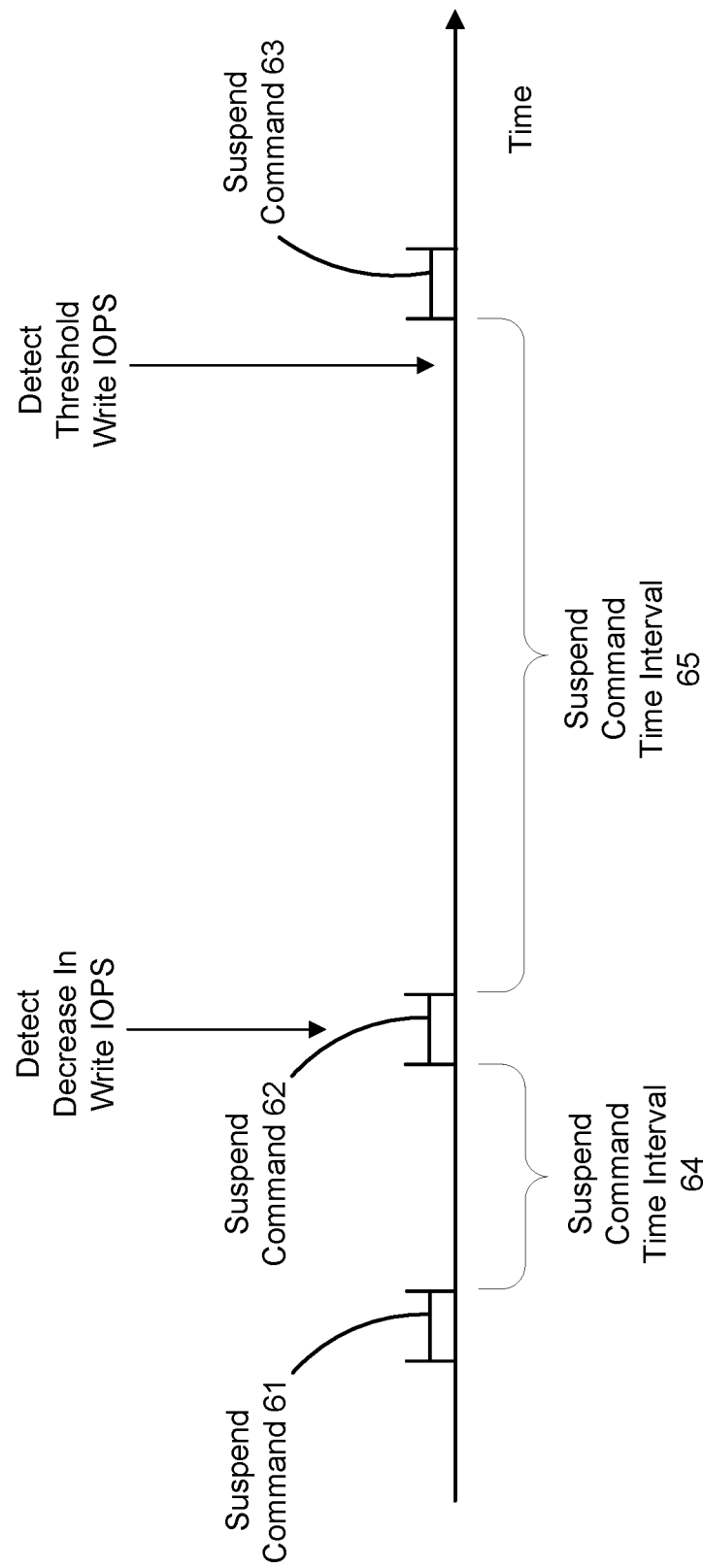
FIG. 4 is an exemplary timing diagram of suspend commands issued to a storage device.

FIG. 4 is an exemplary timing diagram of suspend commands issued to the storage device 15 to suspend various commands being executed, such as those pertaining to program and erase operations. In this example, the suspend commands 61 and 62 are issued with a time interval 64 that causes a decrease in the write IOPS (e.g., due to an increase in the write response times). The controller 11 detects this decrease and lengthens the time interval (e.g., time interval 65) until the controller 11 detects that the write IOPS have increased (e.g., to some threshold of desired performance). Then, the controller 11 may issue another suspend command 63 to suspend the operation of a command being executed.

Alternatively or additionally, the controller 11 may take into consideration other factors such as the expected length of an operation. For example, the controller 11 may determine that a certain write operation may be relatively short. The controller 11 may therefore direct suspensions toward the shorter write operations such that the longer write operations can be serviced more promptly. In other words, the controller 11 may optimize write IOPS based on the controller 11's application of suspensions to different operations. Of course, the embodiments herein are not intended to be limited to any particular algorithm.

Figure 5:
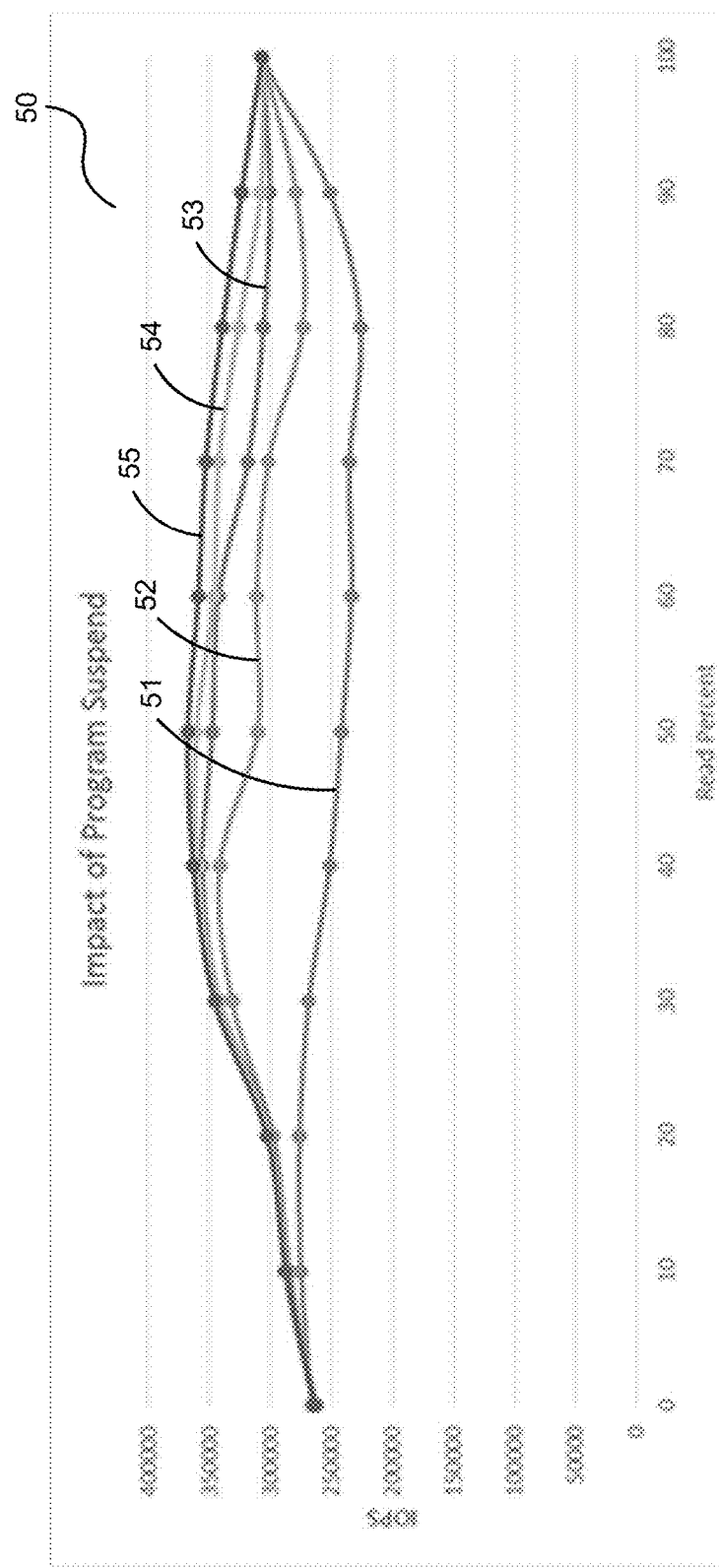
FIG. 5 is an exemplary graph of read Input/Outputs per second (IOPS) with respect to a number of times a single program is allowed to be suspended.

FIG. 5 illustrates a graph 50 of the effect of suspended operations on the read and write IOPS. For example, writes also result in erases due to the need to reclaim partial blocks (e.g., such that there is a location to store write data). And, the balance of read, write, and erase commands in the command queue 30 may fluctuate due to a variety of factors, such as die contention, suspension usage, etc. With zero suspends (illustrated by plot 51), the controller 11 is operable to maintain almost constant read IOPS throughout the percentage of reads in the command queue 30. For example, when the read commands in the command queue 30 occupy 40% of the command queue 30 and there are no command suspensions in place, the read IOPS are about 250,000. This is roughly the same when the read commands occupy 90% of the command queue 30, with little variation between.

However, when a program suspend is implemented the total IOPS increase somewhat dramatically. For example, a single suspend operation (illustrated by plot 52) when the read commands occupy 40% of the command queue 30 increases the total IOPS by almost hundred thousand, when compared to plot 51. But, when two, three, and five suspend operations are implemented (illustrated by plots 53, 54, 55, respectively), there is little change in the total IOPS when the read commands occupy 40% of the command queue. Again, the suspend operations fragment the write commands in the command queue 30 which in turn decreases the write IOPS of the storage device 15. The controller 11 may, therefore, balance the number of suspend operations implemented by maximizing a summation of the read IOPS and the write IOPS as a function of the percentage of read and write commands in the command queue 30.

It should be noted that the embodiments herein are not intended be limited to the examples shown herein. Additionally, the processes described herein are also merely exemplary in nature and are not intended to be limited to the number or order of the process elements of those exemplary embodiments.

Figure 6:
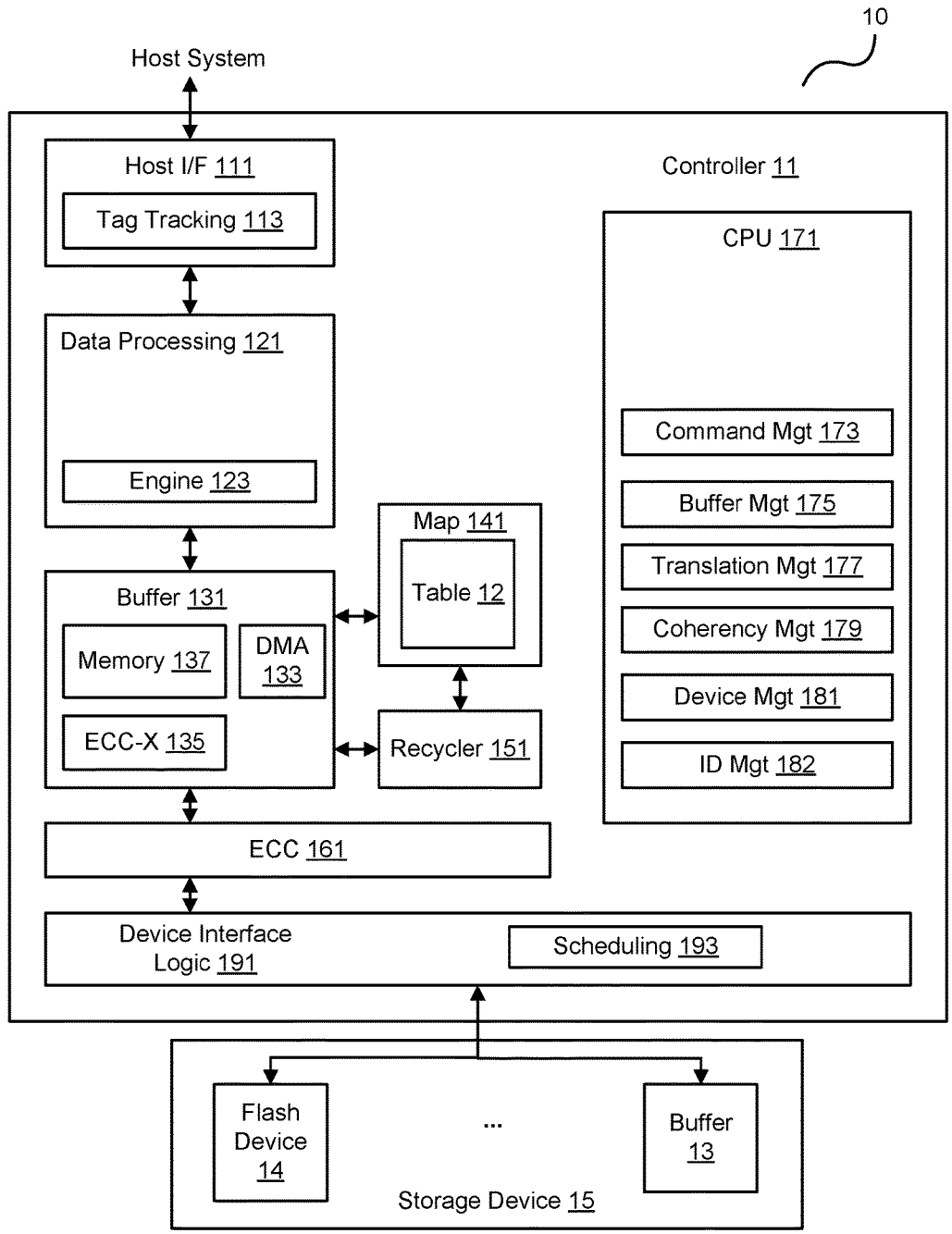
FIG. 6 is a block diagram of an exemplary storage controller and its associated storage device.
Figure 7:
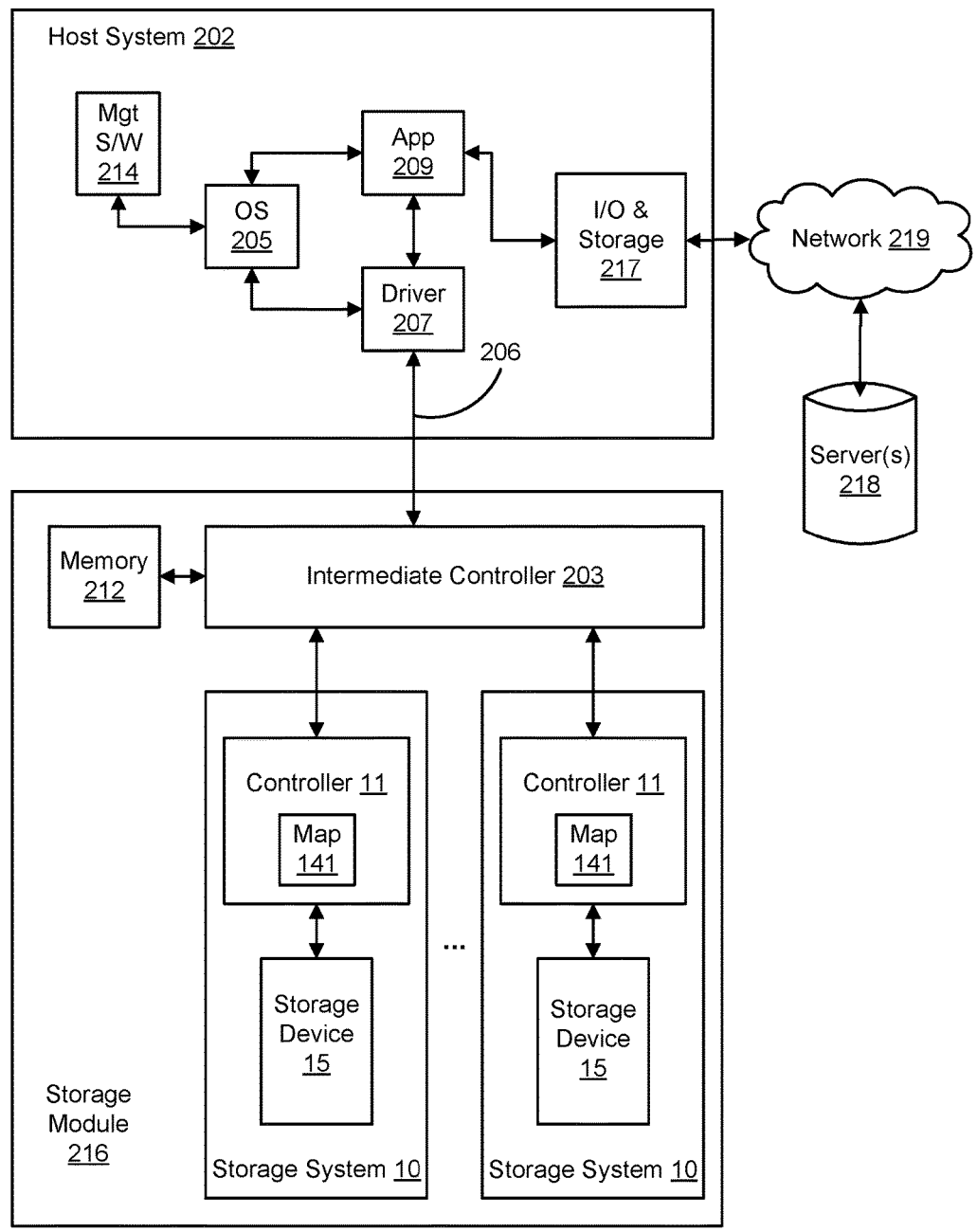
FIG. 7 is a block diagram of an I/O module comprising storage devices and their associated controllers interfacing with a host system.

Furthermore, the embodiments herein can take the form of hardware, firmware, software, or a combination thereof. For example, FIGS. 5 and 6 illustrate such a combination that may be operable to employ the systems and methods described herein. More specifically, FIG. 5 is a block diagram of an exemplary storage system 10 and its associated device controller (e.g., the controller 11) and storage device 15 (e.g., comprising flash devices 14). FIG. 8 is a block diagram of a storage module 216 comprising storage systems 10 and their associated controllers 11/storage devices 15 interfacing with a host system 502.

In FIG. 5, the controller 11 includes a host interface 111 that is operable to interface with a host system to communicate I/O operations of the host system. The host interface 111 may be configured with a tag tracking module 113 that is operable to track progress of individual I/O commands (e.g., read and write commands to certain addresses in the storage device 15). The tag tracking module 113 may associate an external flag of a command received from the host system with an internal flag that the controller 11 can access during processing of the command to identify the status of the processing.

The controller 11 also includes a data processing module 121 that comprises a processing engine 123 generally operable to perform certain tasks on data that is received from the host interface 111 or residing within a buffer 131, such as one or more of formatting the data, transcoding the data, compressing the data, decompressing the data, encrypting the data, decrypting the data, data encoding/formatting, or any combination thereof. For example, a processing engine 123 of the data processing module 121 may be operable to process the I/O operation from an I/O module of the host system generating the operation, such that the data of the I/O operation may be written to the logical address of the storage device 15. The processing engine 123 may extract the data of the write I/O command and prepare it for storage in the storage device 15. In doing so, the processing engine 123 may compress the data using any of a variety of data compression algorithms. When retrieving the data from the storage device 15, the processing engine 123 may decompress the data according to the algorithm used to compress the data for storage.

The buffer 131 is operable to store data transferred to and from the host system. The buffer 131 may also store system data, such as memory tables used by the controller 11 to manage the flash device 14, the buffer 13, and any possible higher-level RAID functionality in the memory 137. Other modules may include an error correcting code (ECC-X) module 135 to provide higher-level error correction and redundancy functionality, and a Direct Memory Access (DMA) module 133 to control movement of data to and from the buffer 131.

The controller 11 also includes an error correction code module 161 operable to provide lower level error correction and redundancy processing of the data in the buffer 131 using any of a variety of error correction codes techniques (e.g., cyclic redundancy checks, Hamming codes, low-density parity check coders, etc.).

A device interface logic module 191 is operable to transfer data to and from the storage device 15 according to the protocol of the devices therein. The device interface logic module 191 includes a scheduling module 193 that is operable to queue I/O operations to the storage device 15.

The controller 11 herein also includes a map module 141 that is operable to perform data addressing to locations in the storage device 15 according to the lookup table 12. For example, the map module 141 may use the lookup table 12 to convert logical block addresses (LBAs) from the host system to block/page addresses directed to the buffer 13, the flash device 14, or both. The lookup table 12 may be stored in whole or in part in controller 11 and/or in storage device 15. For example, in some embodiments a portion of the lookup table 12 may be cached in the controller 11 with generally all of lookup table 12 being stored non-volatilely in the storage device 15.

A recycler 151 performs garbage collection on behalf of the controller 11. For example, the recycler 151 may determine portions of the storage device 15 that are actively in use by scanning the lookup table 12 of the map module 141. In this regard, the recycler 151 may make unused, or "deallocated", portions of the storage device 15 available for writing by erasing the unused portions. The recycler 151 may also move data within the storage device 15 to make larger contiguous portions of the storage device 15 available for writing.

The controller 11 also includes a CPU 171 that controls various aspects of the controller 11. For example, the CPU 171 may process instructions or firmware to implement command management 173 that tracks and controls commands received from the host system. This firmware may also implement buffer management 175 that controls allocation and use of the buffer 131 and translation management 177 or to control the map module 141. The firmware may also employ coherency management 179 to control consistency of data addressing to avoid conflicts such as those that may occur between external data accesses and recycled data accesses. The firmware may also provide device management 181 to control the device interface logic module 191 and identity management 182 to control modification and communication of identity information of components within the controller 11.

In FIG. 6, the host system 202 is operable to process software instructions and perform I/O operations with the storage module 216 to read from and write to one or more storage systems 10. In this regard, the host system 202 may include an operating system 205 that provides the computing environment for the host system 202. A driver 207 is operable to communicate through the link 206 to the storage module 216 to perform the I/O operations with the various storage systems 10 configured therewith.

Like other computing systems, the operating system 205 may be initiated via management software 214 (e.g., Bios software). The host system 202 may also include application software 209 to perform various computing processes on behalf of the host system 202 (e.g., word processing applications, image processing applications, etc.). The host system 202 may also include I/O and storage functionality 217 operable to conduct I/O operations with one or more servers 218 through a communication network 219 (e.g., the Internet, local area networks, wide-area networks, etc.). In this regard, the storage module 216 may act as a cache memory of I/O operations for the host system 202.

The storage module 216 may be configured with an intermediate controller 203 that is operable to switch various I/O operations of the host system 202 to LBAs of the storage systems 10. In this regard, the storage module 216 may include a memory 212 that stores mapping information for the intermediate controller 203 to conduct the I/O operations to the LBAs. The map module 141 of the controller 11 may also be operable to perform data addressing with variable-sized mapping units to locations in the storage device 15 according to the lookup table 12, and convert LBAs from the host system 202 to block/page addresses directed to the storage device 15.

What is claimed is:

1. A storage system, comprising:
   a storage device operable to store data; and
   a controller operable to increase a number of write Input/Output (I/O) suspend operations of the storage device, to detect an increase in response times for write commands to the storage device due to the increased number of the suspend operations, and to adaptively adjust the number of the suspend operations based on a summation of write Input/Output operations per second (IOPS) and read IOPS, the write IOPS being a function of an average read response time and an average write response time.

2. The storage system of claim 1, wherein:
   the storage device is a solid state drive (SSD).

3. The storage system of claim 1, wherein:
   the storage device is a hard disk drive.

4. The storage system of claim 1, wherein:
   the controller is further operable to optimize a number of IOPS of the storage device by monitoring a transformative function of read IOPS and write IOPS of the storage device.

5. The storage system of claim 4, wherein:
   the controller is further operable to adaptively adjust the number of suspend operations based on the transformative function of read IOPS and write IOPS of the storage device.

6. The method of claim 4, further comprising:
   the controller is further operable to adaptively adjust a time interval between the suspend operations based on the transformative function of read IOPS and write IOPS of the storage device.

7. A method operable with a storage device, the method comprising:
   increasing a number of write Input/Output (I/O) suspend operations of the storage device;
   detecting an increase in response times for write commands to the storage device due to the increased number of the suspend operations; and
   adaptively adjusting the number of the suspend operations based on a summation of write Input/Output operations per second (IOPS) and read IOPS, the write IOPS being a function of an average read response time and an average write response time.

8. The method of claim 7, wherein:
   the storage device is a solid state drive (SSD).

9. The method of claim 7, wherein:
   the storage device is a hard disk drive.

10. The method of claim 7, further comprising:
    optimizing a number of IOPS of the storage device by monitoring a transformative function of read IOPS and write IOPS of the storage device.

11. The method of claim 10, further comprising:
    adaptively adjusting the number of suspend operations based on the transformative function of read IOPS and write IOPS of the storage device.

12. The method of claim 10, further comprising:
    adaptively adjusting a time interval between the suspend operations based on the transformative function of read IOPS and write IOPS of the storage device.

13. A non-transitory computer readable medium comprising instructions that, when executed by a controller of a storage device, direct the controller to:
    increase a number of write Input/Output (I/O) suspend operations during of the storage device;
    detect an increase in response times for write commands to the storage device due to the increased number of the suspend operations; and
    adaptively adjust the number of the suspend operations based on a summation of write Input/Output operations per second (IOPS) and read IOPS, the write IOPS being a function of an average read response time and an average write response time.

14. The computer readable medium of claim 13, wherein: the storage device is a solid state drive (SSD).

15. The computer readable medium of claim 13, wherein: the storage device is a hard disk drive.

16. The computer readable medium of claim 13, further comprising instructions that direct the controller to:
optimize a number of IOPS of the storage device by monitoring a transformative function of read IOPS and write IOPS of the storage device.

17. The computer readable medium of claim 16, further comprising instructions that direct the controller to:
adaptively adjust the number of suspend operations based on the transformative function of read IOPS and write IOPS of the storage device.

18. The computer readable medium of claim 16, further comprising instructions that direct the controller to:
adaptively adjust a time interval between the suspend operations based on the transformative function of read IOPS and write IOPS of the storage device.

* * * * *